(12) United States Patent
Huh et al.

(10) Patent No.: US 8,614,812 B2
(45) Date of Patent: Dec. 24, 2013

(54) IMAGE FORMING APPARATUS AND METHOD

(75) Inventors: Young-hee Huh, Ulsan (KR); Sung-won Chae, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 459 days.

(21) Appl. No.: 12/431,791

(22) Filed: Apr. 29, 2009

(65) Prior Publication Data
US 2010/0053668 A1 Mar. 4, 2010

(30) Foreign Application Priority Data
Sep. 3, 2008 (KR) .................. 10-2008-0086981

(51) Int. Cl.
*G06F 3/12* (2006.01)
*G06F 15/00* (2006.01)
*G06K 15/00* (2006.01)
*G03G 15/00* (2006.01)
*G06F 15/16* (2006.01)

(52) U.S. Cl.
USPC ............ 358/1.15; 358/1.9; 358/1.16; 399/16; 399/81; 709/207

(58) Field of Classification Search
USPC ......... 358/1.15, 1.9; 707/1; 709/247; 399/16, 399/82
See application file for complete search history.

(56) References Cited

U.S. PATENT DOCUMENTS

| | | | |
|---|---|---|---|
| 6,809,831 B1 * | 10/2004 | Minari ........................ | 358/1.15 |
| 6,823,147 B2 * | 11/2004 | Jackelen et al. ................ | 399/16 |
| 6,865,354 B2 * | 3/2005 | Jackelen et al. ................ | 399/81 |
| 7,720,926 B2 * | 5/2010 | Asahara ........................ | 709/207 |
| 2003/0053810 A1 * | 3/2003 | Jackelen et al. ................ | 399/16 |
| 2004/0047643 A1 | 3/2004 | Jackelen et al. | |
| 2005/0210227 A1 | 9/2005 | Emerson et al. | |
| 2007/0050320 A1 * | 3/2007 | Carrier .............................. | 707/1 |
| 2007/0220475 A1 | 9/2007 | Asahara | |
| 2008/0024802 A1 * | 1/2008 | Kato .............................. | 358/1.9 |
| 2008/0137142 A1 | 6/2008 | Jung | |
| 2008/0174811 A1 * | 7/2008 | Tanaka et al. ................. | 358/1.15 |
| 2008/0190308 A1 | 8/2008 | Kiwada et al. | |
| 2008/0266604 A1 * | 10/2008 | Kuroki et al. ................. | 358/1.16 |
| 2008/0304097 A1 * | 12/2008 | Maglanque et al. ......... | 358/1.15 |
| 2009/0089455 A1 * | 4/2009 | Nogawa et al. ................ | 709/247 |
| 2009/0109473 A1 * | 4/2009 | Kato ........................... | 358/1.15 |

FOREIGN PATENT DOCUMENTS

| | | | |
|---|---|---|---|
| CN | 101231504 | 7/2008 | |
| EP | 1892616 | 2/2008 | |
| EP | 1892616 A2 * | 2/2008 | ............... G06F 3/12 |
| JP | 2005250606 | 9/2005 | |
| JP | 200833812 | 2/2008 | |
| JP | 2008-197332 | 8/2008 | |

OTHER PUBLICATIONS

European Search Report issued Oct. 16, 2009 in EP Application No. 09167391.3.

(Continued)

*Primary Examiner* — Akwasi M Sarpong
(74) *Attorney, Agent, or Firm* — Stanzione & Kim, LLP (57) ABSTRACT

An image forming apparatus that may include a communication interface unit to receive an Extensible Markup Language (XML) Paper Specification (XPS) file, a determination unit to determine whether printing options set for the received XPS file are supported by the image forming apparatus, and a user interface unit to display a message that a printing option set for the received XPS file is an unsupported printing option if the printing option is not supported by the image forming apparatus.

23 Claims, 5 Drawing Sheets

(56) References Cited

OTHER PUBLICATIONS

Japanese Office Action dated May 21, 2013 issued in JP Application No. 2009-180764.

Chinese Office Action dated May 29, 2013 issued in CN Application No. 200910146897.8.

* cited by examiner

IMAGE FORMING APPARATUS AND METHOD

CROSS-REFERENCE TO RELATED APPLICATIONS

This application claims priority under 35 U.S.C. §119(a) from Korean Patent Application No. 10-2008-0086981, filed on Sep. 3, 2008, in the Korean Intellectual Property Office, the disclosure of which is incorporated herein by reference in its entirety.

BACKGROUND

1. Field of the Invention

The present general inventive concept relates to an image forming apparatus and method. More particularly, the present general inventive concept relates to an image forming apparatus which easily provides a user with replacement printing options when the image forming apparatus does not support printing options set for an Extensible Markup Language (XML) Paper Specification (XPS) file, and an image forming method thereof.

2. Description of the Related Art

Image forming apparatuses are devices for printing print data generated by terminal devices such as computers onto recording media. Examples of such image forming apparatuses include copiers, printers, facsimile machines, and multifunction peripherals (MFP) implementing functions of the aforementioned machines in a single device.

Recent image forming apparatuses support a direct printing function for documents containing files in Portable Document Format (PDF), Tagged Image File Format (TIFF), or Joint Photographic Experts Group (JPG) format. The direct printing function indicates a function for performing printing directly by only transferring files to an image forming apparatus without requiring terminal devices, such as computers, personal digital assistants (PDAs), and digital cameras to execute separate applications.

Data supporting direct printing are provided in Extensible Markup Language (XML) Paper Specification (XPS) format. An XPS file is an electronic file having a fixed layout, in which a document format is preserved and file sharing is enabled, and in which resource needs for corresponding documents or jobs are systematized in a directory structure and data and resources, which record correlation therebetween using XML, are bound as a ZIP archive. The XPS file has a logical tree structure having a plurality of levels as illustrated in FIG. 1.

Figure 1:
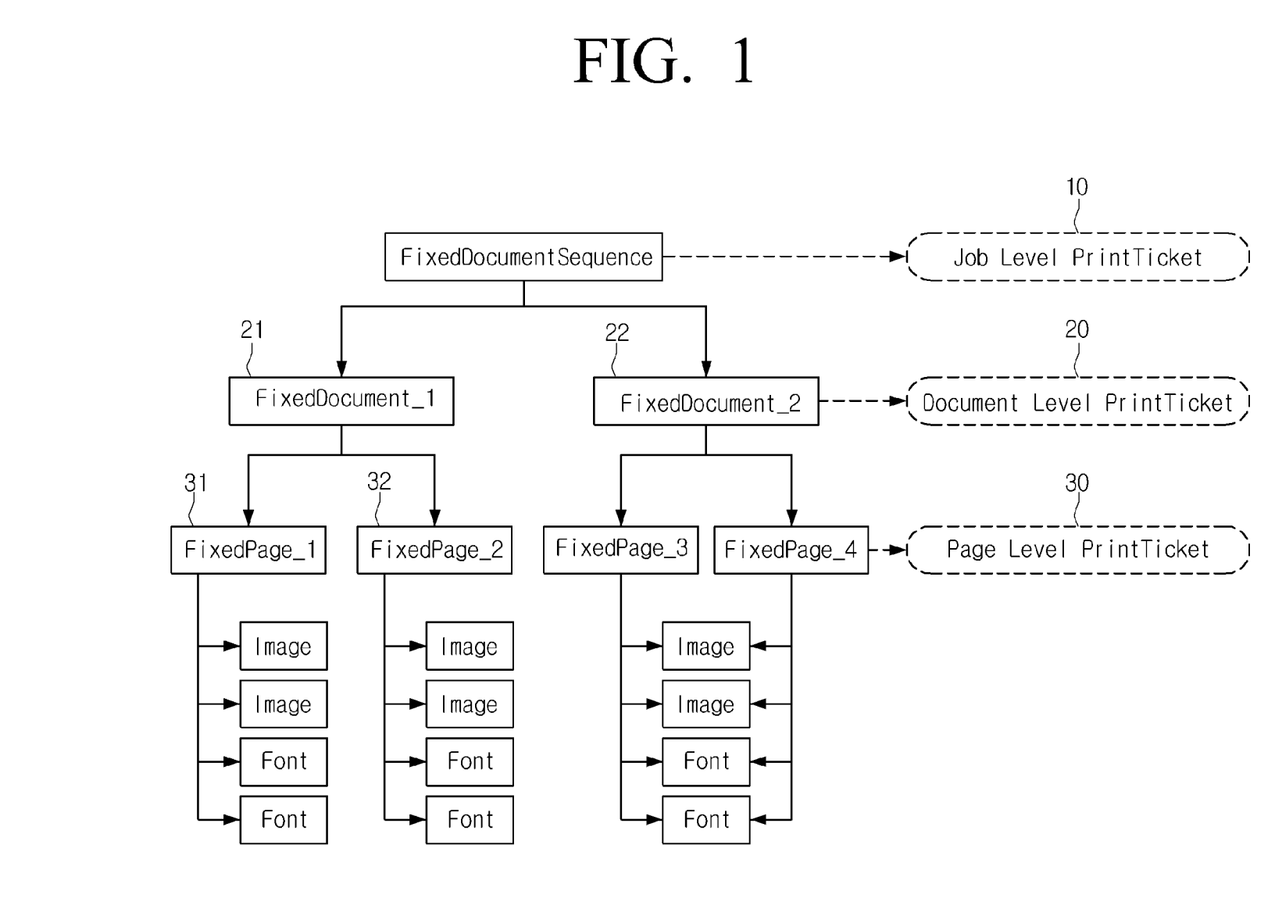
FIG. 1 is a conceptual drawing illustrating the logical structure of an XPS file.

FIG. 1 is a conceptual diagram illustrating the logical structure of an XPS file.

Referring to FIG. 1, information on a printing option set for an XPS file is defined in a PrinterTicket of the XPS file, and the PrinterTicket is hierarchically divided into a job level, a document level, and a page level. Each document level may include a plurality of documents, and each page level may include a plurality of pages. Different printing options may be set for each document or each page. More specifically, printing settings for the job level are applied to the corresponding job, printing settings for the document level are applied to the corresponding document, and printing settings for the page level are applied to the corresponding page.

However, since the printing options set for the XPS file utilize printing options of an image forming apparatus connected when the XPS file is generated, if another image forming apparatus directly prints the XPS file, unintended results may be output.

Moreover, when a user is aware that the printing options set for the XPS file are unavailable in a current image forming apparatus, the user must inconveniently identify and change unavailable printing option items one by one.

SUMMARY

The present general inventive concept provides an image forming apparatus that displays information regarding whether a printing option set for an Extensible Markup Language (XML) Paper Specification (XPS) file is available in a current image forming apparatus, and provides a user with replacement printing options, and an image forming method thereof.

Additional aspects and utilities of the present general inventive concept will be set forth in part in the description which follows and, in part, will be obvious from the description, or may be learned by practice of the present general inventive concept.

Embodiments of the present general inventive concept may be achieved by providing an image forming apparatus including a communication interface unit to receive an Extensible Markup Language (XML) Paper Specification (XPS) file, a determination unit to determine whether printing options set for the received XPS file are supported by the image forming apparatus, and a user interface unit to display a message that a printing option set for the received XPS file is an unsupported printing option if the printing option is not supported by the image forming apparatus.

The determination unit may determine whether a printing option applied to a page of the XPS file is supported by the image forming apparatus.

The user interface unit may display a message indicating that the printing option is the unsupported printing option.

The image forming apparatus may further include a search unit to search for a replacement printing option to replace the unsupported printing option from among the printing options set for the XPS file, and a control unit to change the unsupported printing option to the replacement printing option found by the search unit, so as to print the XPS file.

The search unit may search for the replacement printing option using a printing option applied to a level higher than the unsupported printing option.

The search unit may search for a default printing option as the replacement printing option for the unsupported printing option.

The user interface unit may display the replacement printing option found by the search unit, and receive the user's setting of the replacement printing option to replace the unsupported printing option.

The user interface unit may generate a user interface window including a first area to display the unsupported printing option from among the printing options set for the XPS file, and a second area to display the replacement printing option found by the search unit.

The user interface unit may receive the user's setting of the replacement printing option to replace each unsupported printing option.

The user interface unit may receive the user's setting of a single replacement printing option to replace the same unsupported printing options among the unsupported printing options, and the control unit may collectively change the same unsupported printing options to the replacement printing option set by the user, so as to print the XPS file.

The user interface unit may display a preview of a printing state to be set if the user selects at least one of the replacement printing options.

The image forming apparatus may further include a storage unit to store the XPS file in which the unsupported printing option is replaced with the replacement printing option.

Embodiments of the present general inventive concept may also be achieved by providing an image forming method including receiving an Extensible Markup Language (XML) Paper Specification (XPS) file, determining whether printing options set for the received XPS file are supported by the image forming apparatus, and displaying a message that a printing option set for the received XPS file is an unsupported printing option, if the printing option is not supported by the image forming apparatus.

In the determining operation, a determination of whether a printing option applied to a page of the XPS file is supported by the image forming apparatus.

In the displaying operation, a message may be displayed, indicating that the printing option is an unsupported printing option.

The image forming method may further include searching for a replacement printing option to replace the unsupported printing option from among the printing options set for the XPS file, and changing the unsupported printing option to the searched replacement printing option, and printing the XPS file.

In the searching operation, the replacement printing option may be searched for using a printing option applied to a level higher than the unsupported printing option.

In the searching operation, a default printing option for the unsupported printing option may be searched for as the replacement printing option.

The image forming method may further include displaying the replacement printing option found, and receiving the user's setting of the replacement printing option to replace the unsupported printing option.

In the operation of receiving the user's setting of the replacement printing option, a user interface window may be generated and may include a first area to display the unsupported printing option from among the printing options set for the XPS file and a second area to display the replacement printing option searched by the search unit.

In the operation of receiving the user's setting of the replacement printing option, the replacement printing option, to replace each unsupported printing option, may be set.

In the operation of receiving the user's setting of the replacement printing option, a single replacement printing option, to replace the same unsupported printing options from among unsupported printing options, may be set, and in the printing operation, the XPS file may be printed by collectively changing the same unsupported printing options to the replacement printing option set by the user.

In the operation of receiving the user's setting of the replacement printing option, a preview of a printing state to be set may be displayed if the user selects at least one of the replacement printing options.

The image forming method may further include storing the XPS file, in which the unsupported printing option is replaced with the replacement printing option.

Embodiments of the present general inventive concept may also be achieved by proving a peripheral device, comprising a host port to receive an Extensible Markup Language (XML) Paper Specification (XPS) file with printing options; a printing option adjustment unit for establishing whether the printing options of the XPS file are supported by the peripheral device; and a display to indicate whether a printing option of the XPS file is supported by the peripheral device.

Embodiments of the present general inventive concept may also be achieved by providing a method of replacing unrecognized printing options of an Extensible Markup Language (XML) Paper Specification (XPS) file with recognized printing options within a peripheral device, comprising receiving a XPS file with printing options; verifying whether printing options within the XPS file are recognized by the peripheral device; searching within a peripheral device database for recognized printing options similar to any unrecognized printing options within the XPS file; replacing the unrecognized printing options within the XPS file with the recognized printing options; and displaying an indication that the unrecognized printing options were replaced with the recognized printing options.

BRIEF DESCRIPTION OF THE DRAWINGS

Embodiments of the present general inventive will become apparent and more readily appreciated from the following description of the embodiments, taken in conjunction with the accompanying drawings of which.

DETAILED DESCRIPTION OF THE EMBODIMENTS

Reference will now be made in detail to exemplary embodiments of the present general inventive concept, examples of which are illustrated in the accompanying drawings, wherein like reference numerals refer to like elements throughout. By referring to the figures, the embodiments are described below in order to explain the present general inventive concept.

Figure 2:
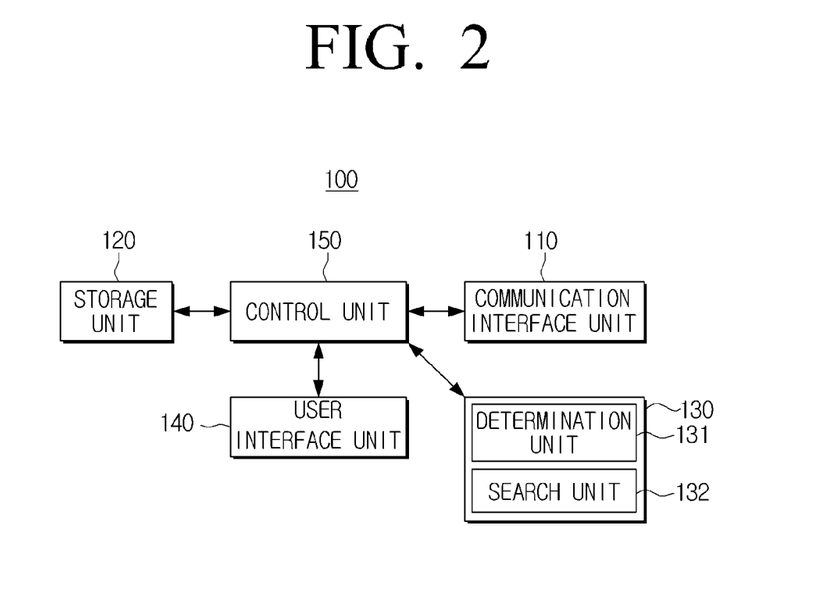
FIG. 2 is a schematic block diagram illustrating an image forming apparatus according to an exemplary embodiment of the present general inventive concept.

FIG. 2 is a schematic block diagram illustrating an image forming apparatus according to an exemplary embodiment of the present general inventive concept. Referring to FIG. 2, the image forming apparatus 100 may include a communication interface unit 110, a storage unit 120, a printing option adjustment unit 130, a user interface unit 140, and a control unit 150.

The communication interface unit 110 may be connected to terminal devices (not shown), such as computers, personal digital assistants (PDAs), or digital cameras, so as to receive an Extensible Markup Language (XML) Paper Specification (XPS) file. In greater detail, the communication interface unit 110 may connect the image forming apparatus 100 to external devices, and may be connected to terminal devices via a local area network (LAN) or the Internet, or may access terminal devices via a universal serial bus (USB) port.

As described above, the XPS file may represent printing data for which a printing option is set with a tree structure having a plurality of levels. That is, the XPS file has a plurality of levels, and separate printing options are set for each level or each node of the tree.

For example, as illustrated in FIG. 1, the XPS file may have three levels, including a job level 10, a document level 20, and a page level 30. In a document level 20, printing options may be set for each document, and in a page level 30, printing options may be set for each page. "Duplex on" may be set as a printing option for the job level 10, "2-up" may be set as a printing option for a first document 21 in the document level 20, "A4 paper size" may be set as a printing option for a first page 31 of a first document 21, and "A5 paper size" may be set as a printing option for a second page 32 of a first document 21. In this case, a printing option at each node of the logical structure may be applied to lower levels as an effective printing option.

The storage unit 120 may store the XPS file received from a terminal device through the communication interface unit 110. The storage unit 120 may be implemented as an external storage medium which is not mounted in the image forming apparatus 100, such as a USB memory device which can be externally connected to the image forming apparatus 100.

The printing option adjustment unit 130 may determine if the image forming apparatus 100 supports printing options set for XPS file, and may search for replacement printing options if the image forming apparatus 100 does not support the printing options set for the XPS file. The printing option adjustment unit 130 may include a determination unit 131 and a search unit 132.

The determination unit 131 may determine if the image forming apparatus 100 supports the printing options set for the XPS file. In greater detail, the determination unit 131 may analyze the logical structure of the printing options set for the XPS file received through the communication interface unit 110, and may determine if the image forming apparatus 100 supports the printing options applied to the page level of the XPS file.

For example, if "Duplex on" is set in a job level of the XPS file and "A3 paper size" is set in a document level under the job level, the printing options set in the job level and the document level may be applied to pages under the document level, so the determination unit 131 may determine that the printing options "Duplex on" and "A3 paper size" are set for the corresponding pages. If the image forming apparatus 100 cannot support "Duplex on" and "A3 paper size," the determination unit 131 may determine that "Duplex on" and "A3 paper size" cannot be applied to the corresponding pages.

The search unit 132 may search for a replacement printing option for an unavailable printing option from among the printing options set for the XPS file. The replacement printing option requires a user's additional effort, but obtains the same printout as the originally set printing option, or obtains a similar effect. For example, in the case of Duplex printing, if odd-numbered pages are printed and even-numbered pages are printed on the rear sides of the printed papers, the same printout as duplex printing can be obtained.

If there is an unsupported printing option in the XPS file, the search unit 132 may search for a replacement printing option. More specifically, the search unit 132 may search for a replacement printing option using a preset printing option automatic adjustment algorithm, which may search for a printing option to obtain the most similar printout to the printout obtained by the unsupported printing option. The replacement printing option may be searched for using a database initially input by a developer. The database may be updated according to the user's replacement option setting pattern. There may be a single optimal searched replacement printing option or a plurality of searched replacement printing options.

If there is no replacement printing option for the printing option set for the XPS file, the search unit 132 may search for a default printing option (an initial value) of the image forming apparatus 100 as the replacement printing option. For example, if "A3 paper size" is set for the XPS file when an image forming apparatus 100 is used, which does not support "A3 paper size" and thus does not have a printing option to replace "A3 paper size," the search unit 132 may search for an initial value of the image forming apparatus 100, e.g. "A4 paper size," as a replacement printing option.

Alternatively, the search unit 132 may search for a printing option applied to an upper level of the unsupported printing option from among the printing options set for the XPS file as the replacement printing option. For example, if "letter paper" is set in a document level, and "A3 paper size" is set in a page level under the document level, the image forming apparatus 100 which does not support "A3 paper size" may search for "letter paper" applied to the upper level of the printing option "A3 paper size" as a replacement printing option.

The user interface unit 140 may display information on an unsupported printing option from among the printing options set for the XPS file, so that the user can set conditions or a printing option to replace the unsupported printing option. The user interface unit 140 may include a plurality of function keys through which the user may set or select diverse functions supported by the image forming apparatus 100, and may display diverse information provided by the image forming apparatus 100. The user interface unit 140 may be implemented as a device capable of input and output simultaneously, such as a touch pad, or a device that combines a mouse and a monitor.

In more detail, the user interface unit 140 may generate a user interface (UI) window which may include a first area to display unavailable printing options from among printing options set for the XPS file, and a second area to display replacement printing options found by the search unit 132. Alternatively, the user interface unit 140 may display a message representing an unavailable printing option in the form of a tool tip, and display a printing option found. Detailed description of the UI window provided to the user will be further provided below.

As a result of determination by the determination unit 131 of whether a printing option unsupported by the image forming apparatus 100 is included among the printing options set for the XPS file, the control unit 150 may control the user interface unit 140 to display a message stating that there is an unsupported printing option set for the XPS file. In other words, when a printing operation unsupported by the image forming apparatus 100 is set for the XPS file, the control unit 150 may control the user interface unit 140 to display a message indicating that the printing operation can not be applied to the image forming apparatus 100.

Subsequently, the control unit 150 can control the search unit 132 to search for a replacement printing option for the unsupported printing option. More specifically, the control unit 150 may control the user interface unit 140 to ask the user how to process the unsupported printing option, and may control the search unit 132 to search for a replacement printing option according to the manner selected by the user. The operation of asking the user how to process the unsupported printing option may be omitted, and instead a replacement printing option may be searched for automatically.

The control unit 150 may control the user interface unit 140 to display a replacement printing option found by the search unit 132, so that the user can select whether the unsupported printing option should be replaced with the replacement printing option found. For example, if there are a plurality of replacement printing options found, the control unit 150 may display the plurality of replacement printing options found on the user interface unit 140, and may apply a printing option selected by the user through the user interface unit 140 as a replacement printing option. In addition, even when there is only one replacement printing option found, the control unit 150 may control the user interface unit 140 to ask the user whether to apply the replacement printing option found.

If there are a plurality of replacement printing options found, the control unit 150 may set a printing option having a high priority according to a preset priority to be a replacement printing option. In addition, the control unit 150 may set a printing option selected by the user, instead of a currently displayed replacement printing option, to be a replacement printing option. Further, since the user may select a replacement printing option or printing options instead of the displayed printing option, the control unit 150 may set a printing option selected by the user to be a replacement printing option. For example, if "12-up" is set in a document level of the XPS file, but the image forming apparatus 100 may only process up to "8-up," "8-up" and "4-up" may be displayed to the user as replacement printing options. In this case, the user may use "2-up" or "1-up" instead of the displayed "8-up" or "4-up." Accordingly, if the user selects a printing option instead of the currently displayed replacement printing options, the selected printing option is set to be a replacement printing option.

If the user selects at least one of the replacement printing options, the control unit 150 may control the user interface unit 140 to display a preview of the printing state to be set. More specifically, if the user selects a plurality of printing options, a preview of the applied state can be displayed on one side of the UI window in order to show the user how a selected printing option is applied.

The control unit 150 may control the storage unit 120 to store the XPS file, in which the unsupported printing option is replaced with a printing option found by the search unit 132 or a printing option selected by the user. In greater detail, since the XPS file may be repeated to be output, the control unit 150 may store the XPS file having the changed printing option in the storage unit 120. In this case, the control unit 150 may store the XPS file having the changed printing option under a different name, or overwrite the original XPS file. Such an operation may be performed by the user's selection, or may be performed automatically without a command from the user.

Accordingly, the user may easily recognize information on a printing option which the image forming apparatus 100 does not support, from among printing options set for the XPS file, and conveniently change the unsupported printing option using provided information on a replacement printing option.

Figure 3:
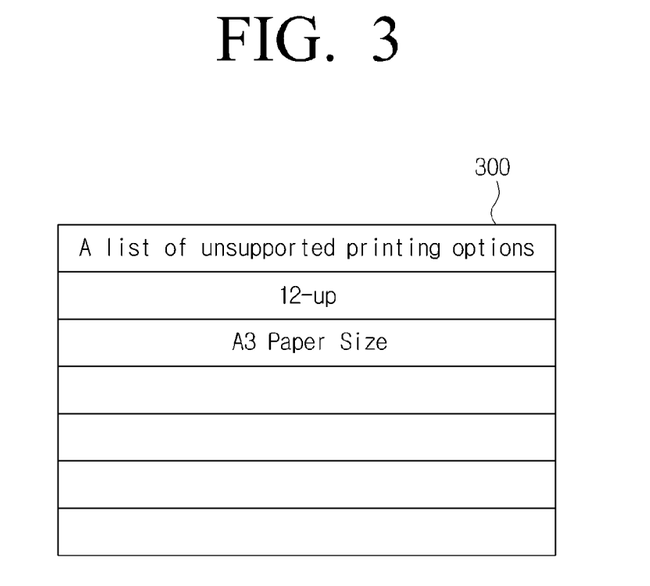
FIGS. 3 through 7 illustrate diverse examples of a user interface window of an image forming apparatus according to exemplary embodiments of the present general inventive concept.

FIG. 3 illustrates a user interface window displayed on an image forming apparatus, according to an exemplary embodiment of the present general inventive concept.

Referring to FIG. 3, the UI window 300 can display printing options which the image forming apparatus 100 does not support, from among printing options set for the XPS file. More specifically, since diverse printing options may be set for the XPS file, and there may be a plurality of printing options which the image forming apparatus 100 does not support, the unsupported printing options may be displayed as a list.

Figure 4:
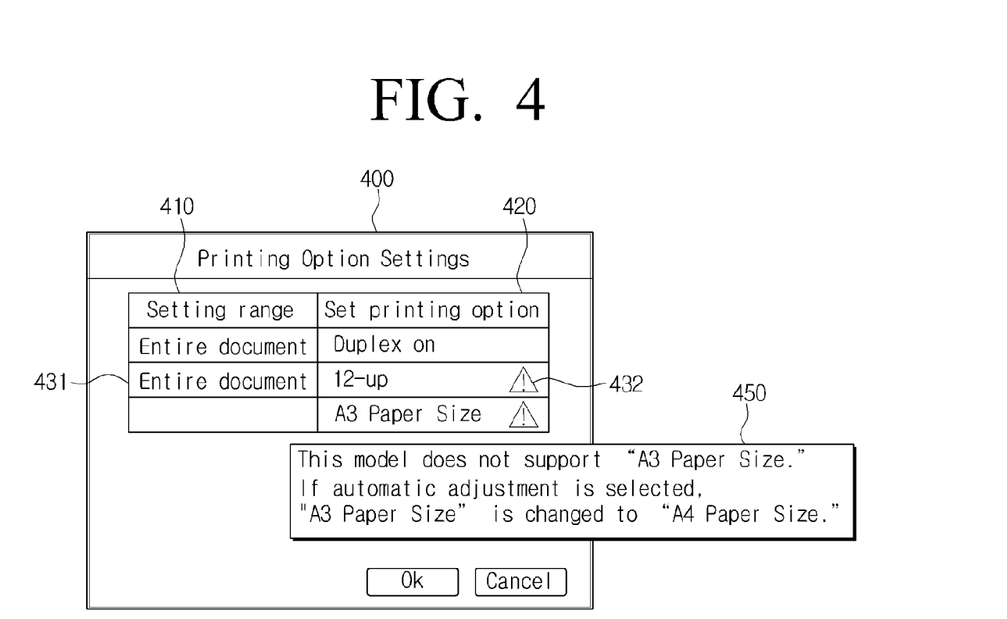

FIG. 4 illustrates a user interface window displayed on an image forming apparatus, according to another exemplary embodiment of the present general inventive concept.

Referring to FIG. 4, the UI window 400 may include an area 420 to display printing options set for the XPS file, an area 410 to display a setting range to which the corresponding printing option is applied, and an area 432 to display whether the corresponding printing option is supported by the image forming apparatus 100.

In greater detail, diverse printing options having different setting ranges may be set for the XPS file. The UI window 400 can display to the user all the printing options 420 set for the XPS file, and the setting ranges 410 of the corresponding printing options. As for the printing options illustrated in FIG. 4, the printing option "Duplex on" can indicate duplex printing, "12-up" can indicate printing of 12 pages on one side, and "A3 Paper Size" can indicate printing on A3 paper.

Since "12-up" and "A3 Paper Size" are only applied to image forming apparatuses supporting printing of 12 pages on one side and A3 paper, image forming apparatuses which do not support printing of 12 pages on one side and A3 paper cannot set the two printing options. If such image forming apparatuses not supporting the two printing options output the XPS file to which the two printing options are applied or try to obtain such information, the two printing options set for the XPS file can be displayed to the user with icons. That is, "Duplex on" can be displayed as usual since the image forming apparatus 100 can support "Duplex on," but "12-up" and "A3 Paper Size" can be displayed on a list within area 432 with the icon "!" since the image forming apparatus 100 cannot support both "12-up" and "A3 Paper Size." Accordingly, the user can easily recognize information on printing options which are not supported by the image forming apparatus 100 from among the printing options set for the XPS file.

As illustrated in FIG. 4, a message 450 informing the user that the printing options which are not supported by the image forming apparatus 100 are set for the XPS file, may be displayed in the UI window 400. More specifically, the message 450 may simply display a message that the printing options are not supported by the image forming apparatus 100, or may include information on replacement printing options.

The message 450 may be provided in the form of a tool tip, so the message 450 may disappear after a predetermined time, or may disappear when a mouse moves or another printing option is selected. In addition, characteristics of the tool tip such as the position, font, font size, and background color of the tool tip can be varied.

Figure 5:
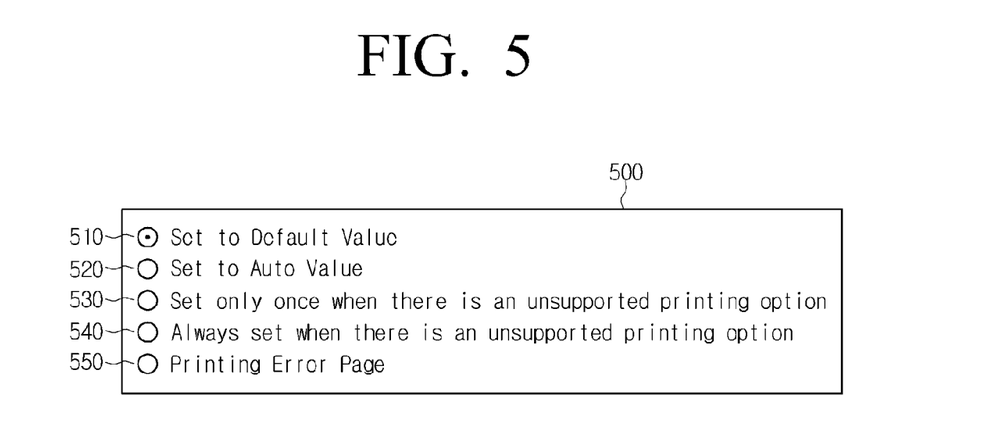

FIG. 5 illustrates a user interface window of which the user is able to select a manner to solve a problem with a printing option that is not supported by an image forming apparatus is set for the XPS file.

When a printing option which is not supported by an image forming apparatus is set for the XPS file, printing may be performed by changing the printing option using diverse manners. The processing options illustrated in FIG. 5 are described here.

"Set to Default Value" can indicate that the unsupported printing option is changed to a default value in a category of the corresponding printing option. For example, in an image forming apparatus which does not support "A3 paper size," if "A3 paper size" is set for the XPS file, "A3 paper size" may be changed to "A4 paper size," which is set as a default value in a category regarding paper size in the image forming apparatus.

"Set to Auto Value" can indicate that the unsupported printing option is automatically changed to another printing option using a preset algorithm. In greater detail, "Set to Auto Value" can search for a printing option capable of obtaining the most similar output of which the unsupported printing option could obtain, so the search for the printing option can use a database initially input by a developer. For example, in an image forming apparatus capable of processing up to "4-up," printing options "12-up" and "8-up" exceeding "4-up" may be automatically changed to "4-up."

"Set only once when there is an unsupported printing option" can indicate that the unsupported printing option and replacement printing options can be displayed to the user, and thus if the user selects a replacement printing option, the same unsupported printing options can be collectively changed to the selected replacement printing option. In greater detail, if an unsupported printing option is set for diverse setting ranges of the XPS file and the user changes the unsupported printing option set for a single setting range, the same unsupported printing options for the remaining setting ranges can be collectively changed. If the user selects "Set only once when there is an unsupported printing option," a user interface window as illustrated in FIG. 6 may be displayed.

Figure 6:
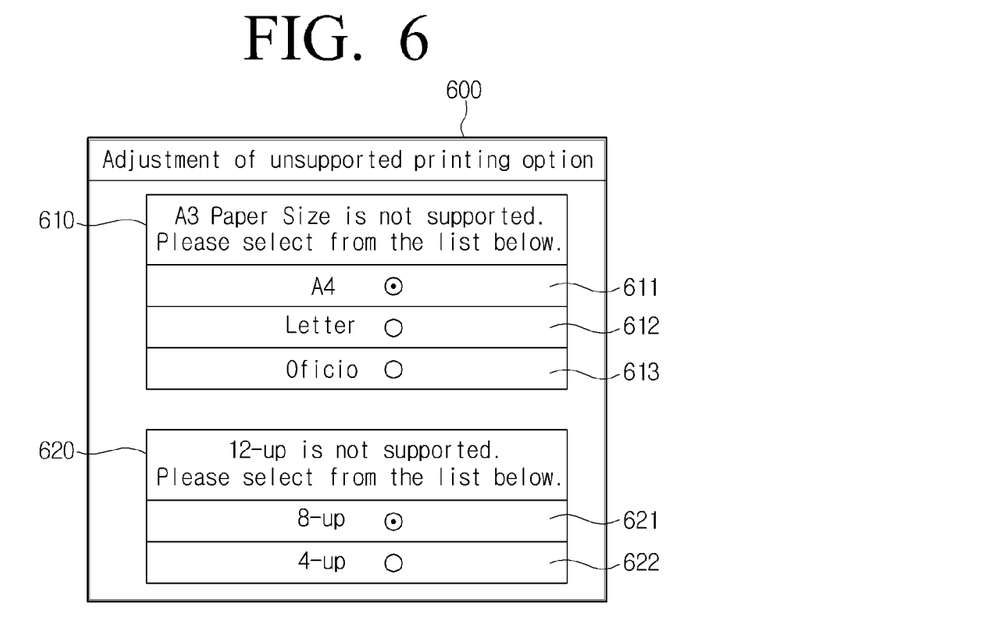

FIG. 6 illustrates a user interface window by which the user is able to change an unsupported printing option to a replacement printing option using "Set only once when there is an unsupported printing option."

Referring to FIG. 6, the UI window 600 can display unsupported printing options "A3 paper size" 610 and "12-up" 620, and can display replacement printing options for each unsupported printing option thereunder. In greater detail, in order to replace unsupported printing option "A3 paper size" 610, the user can select "A4" 611 from among replacement printing options "A4" 611, "Letter" 612, and "Oficio" 613, wherein "A4" can be applied to all the setting ranges of the XPS file in which "A3 paper size" is set, instead of "A3 paper size." In order to replace unsupported printing option "12-up" 620, the user can select "8-up" 621 from among replacement printing options "8-up" 621 and "4-up" 622, wherein "8-up" can be applied to all the setting ranges of the XPS file in which "12-up" is set, instead of "12-up."

"Always set when there is an unsupported printing option" can indicate that if the unsupported printing option and replacement printing options are displayed to the user, the user can select a replacement printing option for each unsupported printing option. In greater detail, when an unsupported printing option is set for diverse setting ranges of the XPS file, the unsupported printing option for each setting range can be changed according to the setting of the user. If the user selects "Always set when there is an unsupported printing option," a user interface window, as illustrated in FIG. 7, may be displayed.

Figure 7:
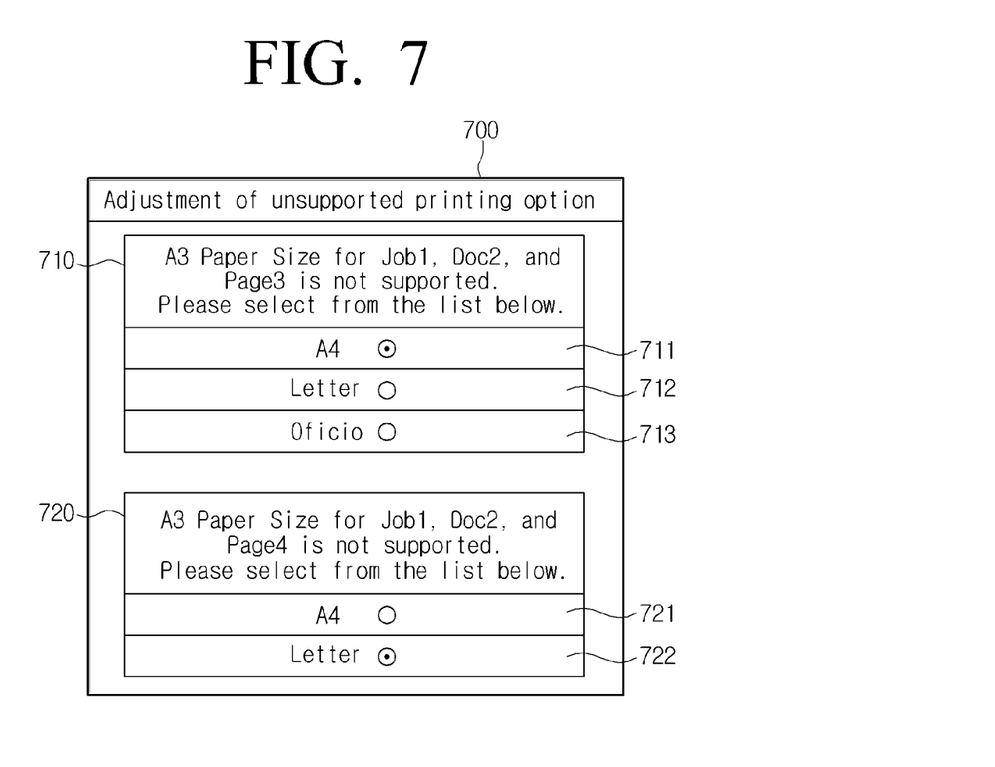

FIG. 7 illustrates a user interface window by which the user is able to change an unsupported printing option to a replacement printing option using "Always set when there is an unsupported printing option."

Referring to FIG. 7, if the unsupported printing option "A3 paper size" is set for diverse setting ranges of the XPS file, the UI window 700 can display the unsupported printing option "A3 paper size" 710 and 720 for each setting range, and can display replacement printing options for each setting range thereunder. In greater detail, in order to replace "A3 paper size" 710 set for page 3, document level 2, and job level 1 of the XPS file, the user can select "A4" 711 from among replacement printing options "A4" 711, "Letter" 712, and "Oficio" 713, wherein "A4" can be applied to page 3, document level 2, and job level 1 of the XPS file in which "A3 paper size" is set. In order to replace "A3 paper size" 720 set for page 4, document level 2, and job level 1 of the XPS file, the user can select "Letter" 722 from among replacement printing options "A4" 721 and "Letter" 722, wherein "Letter" can be applied to page 4, document level 2, and job level 1 of the XPS file in which "A3 paper size" is set.

"Printing Error Page" can indicate that the printing operation is stopped and an error message informing the user that an unsupported printing option is set is output. The error message may include the name of the XPS file, the unsupported printing option, and replacement printing options.

Such processing as illustrated in FIG. 5, when the unsupported printing option is included in the XPS file, may be selected when installing the image forming apparatus 100 so that the selected manner can be continuously applied afterwards, or may be selected whenever the XPS file including an unsupported printing option are printed.

In the description provided above with reference to FIGS. 1 to 7, the present general inventive concept can be applied to image forming apparatuses such as laser printers and multi-function peripherals, and the operations as illustrated in FIGS. 1 to 7 may also be performed in conjunction with commands transmitted from terminal devices, such as computers, and portable media players (PMPs), to transmit the XPS file to image forming apparatuses.

Figure 8:
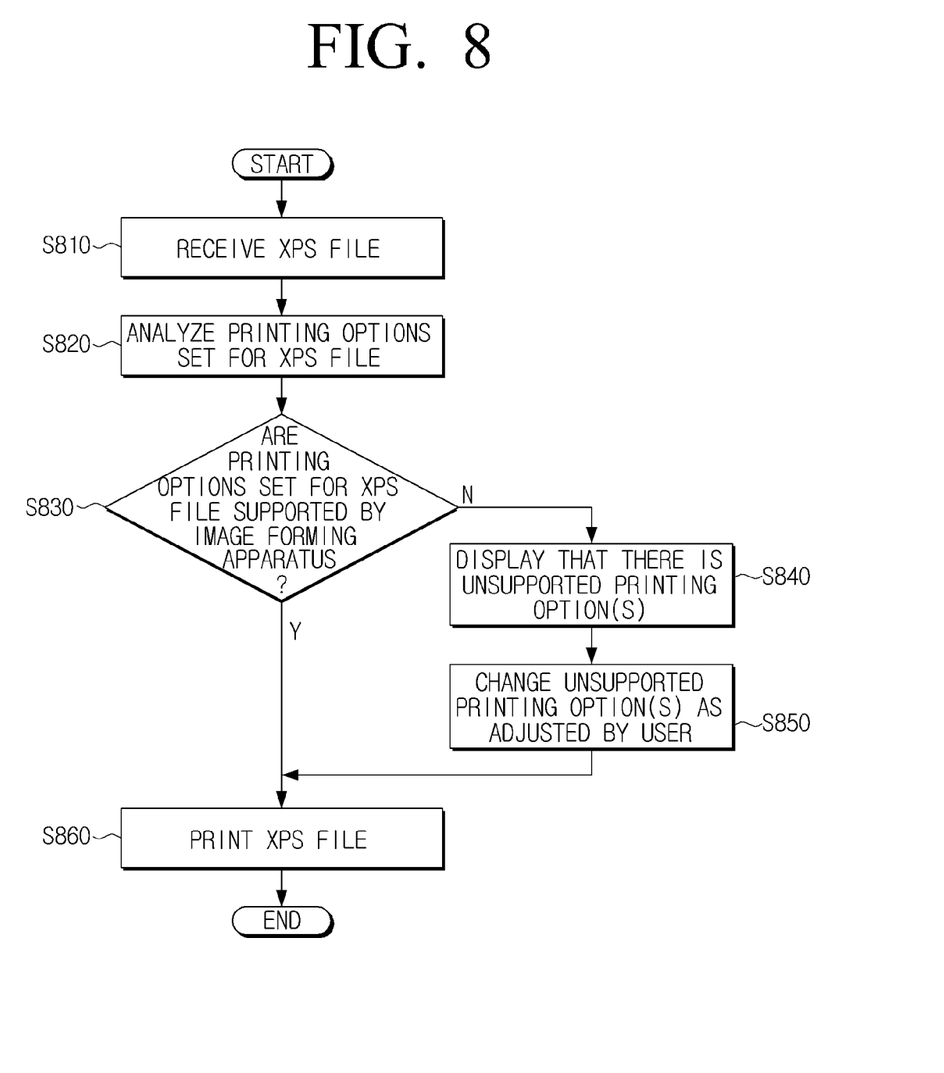
FIG. 8 is a flowchart illustrating an image forming method according to an exemplary embodiment of the present general inventive concept.

FIG. 8 is a flowchart illustrating an image forming method according to an exemplary embodiment of the present general inventive concept.

Referring to FIG. 8, in operation S810, an image forming apparatus can receive the XPS file for which printing options are set in a tree structure having a plurality of levels, and in operation S820, the printing options set for the XPS file are analyzed.

In operation S830, whether the printing options are supported by the image forming apparatus can be determined. More specifically, whether a printing option applied to a page of the XPS file can be supported by the image forming apparatus is determined. For example, when a duplex printing option is set for the XPS file, and the image forming apparatus does not support duplex printing, it can be determined that the duplex printing option is an unsupported printing option.

If all of the printing options set for the XPS file are determined to be supported by the image forming apparatus in operation S860, then the image forming apparatus can print the XPS file with all of the printing options applied.

Alternatively, in operation S840, if there is a printing option set for the XPS file which is not supported by the image forming apparatus, then the image forming apparatus can display a message that the printing option is not supported by the image forming apparatus. More specifically, unsupported printing options from among the printing options set for the XPS file may be displayed as a list on the user interface or on the user interface on which the printing options set for the XPS file, and a setting range, to which a corresponding printing option is applied, may be displayed, and an icon indicating an unsupported printing option may be displayed on one side of the printing option. In addition, a message representing an unsupported printing option may be displayed as a user interface window in the form of a tool tip. The message may simply display that the printing option is not supported by the image forming apparatus, or may further include information on replacement printing options. Such an operation of displaying the unsupported printing options on the user interface is described above with reference to FIGS. 3 and 4.

In operation S850, when there is an unsupported printing option in the XPS file, a replacement printing option to replace the unsupported printing option may be set. More specifically, a replacement printing option may be selected by the user searching for the replacement printing option, or using a preset algorithm. Whether to perform automatic adjustment may be selected by the user in the same form as a printing option, or adjustment may be automatically selected. Alternatively, a plurality of replacement printing options to replace the unsupported printing option may be displayed, as illustrated in FIGS. 6 and 7, so that the user can select one of the replacement printing options, or a single optimal replacement printing option may be set directly.

In operation S860, the image forming apparatus can print the XPS file after changing the unsupported printing option in the XPS file to the replacement printing option. In this case, the XPS file, to which the changed printing option is applied, may be stored by a user command or automatically.

Hence, the user can easily recognize whether a printing option, which is not supported by an image forming apparatus, is set for XPS file to print, and conveniently change the unsupported printing option to a replacement printing option. An image forming method as in FIG. 8 may be executed in an image forming apparatus having a configuration as in FIG. 2, and also be executed in image forming apparatuses having a different configuration.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
   an image forming unit;
   a communication interface unit to receive an Extensible Markup Language (XML) Paper Specification (XPS) file, the Extensible Markup Language (XML) Paper Specification (XPS) file is hierarchically divided into a job level, a document level, and a page level and the printing options for the job level are applied to the corresponding job, the printing options for the document level are applied to the corresponding document, and the printing options for the page level are applied to the corresponding page;
   a determination unit to determine whether the printing options set for the received XPS file are supported by the image forming apparatus;
   a user interface unit to display a message that a printing option set for the received XPS file is an unsupported printing option if the printing option is not supported by the image forming apparatus; and
   a control unit to search a replacement printing option to replace the unsupported printing option from among the printing options set for the XPS file and change the unsupported printing option to the replacement printing option and control the image forming unit to print the XPS file using the replacement printing option, with the control unit to search for the replacement printing option according to a replacement option setting pattern.

2. The image forming apparatus according to claim 1, wherein the determination unit can determine that the printing options set for the received XPS file are supported by the image forming apparatus, if the printing option applied to the page level of the XPS file is supported by the image forming apparatus.

3. The image forming apparatus according to claim 1, wherein the user interface unit can display a message indicating that the printing option is the unsupported printing option.

4. The image forming apparatus according to claim 1, wherein the control unit can search for a default printing option for the unsupported printing option as the replacement printing option.

5. The image forming apparatus according to claim 1, wherein the user interface unit can display the replacement printing option found by the control unit, and can receive the user's setting of the replacement printing option to replace the unsupported printing option.

6. The image forming apparatus according to claim 5, wherein the user interface unit can generate a user interface window including a first area to display the unsupported printing option from among the printing options set for the XPS file, and a second area to display the replacement printing option(s) found by the control unit.

7. The image forming apparatus according to claim 5, wherein the user interface unit can receive the user's setting of the replacement printing option to replace each unsupported printing option.

8. The image forming apparatus according to claim 5, wherein the user interface unit can receive the user's setting of a single replacement printing option to replace the same unsupported printing options among the unsupported printing options, and
   the control unit can collectively change the same unsupported printing options to the replacement printing option set by the user in order to print the XPS file.

9. The image forming apparatus according to claim 5, wherein the user interface unit can display a preview of a printing state to be set if the user selects at least one of the replacement printing options.

10. The image forming apparatus according to claim 1, further comprising:
    a storage unit to store the XPS file in which the unsupported printing option is replaced with the replacement printing option.

11. An image forming method of an image forming apparatus, comprising:
    receiving an Extensible Markup Language (XML) Paper Specification (XPS) file, the Extensible Markup Language (XML) Paper Specification (XPS) file is hierarchically divided into a job level, a document level, and a page level and the printing options for the job level are applied to the corresponding job, the printing options for the document level are applied to the corresponding document, and the printing options for the page level are applied to the corresponding page;
    determining whether the printing options set for the received XPS file are supported by the image forming apparatus;
    displaying a message that a printing option set for the received XPS file is an unsupported printing option if the printing option is not supported by the image forming apparatus;
    searching for a replacement printing option to replace the unsupported printing option from among the printing options set for the XPS file by searching for the replacement printing option according to a replacement option setting pattern;
    changing the unsupported printing option to the searched replacement printing option; and
    printing the XPS file using the replacement printing option.

12. The image forming method according to claim 11, wherein determining whether printing options set for the received XPS file are supported by the image forming apparatus further comprises:
    determining that whether the printing option set for the received XPS file are supported by the image forming apparatus, if the printing option applied to the page level of the XPS file can be supported by the image forming apparatus.

13. The image forming method according to claim 11, wherein displaying a message that a printing option is set for the received XPS file is an unsupported printing option if the printing option is not supported by the image forming apparatus further comprises:
    displaying a message to indicate that the printing option is an unsupported printing option.

14. The image forming method according to claim 11, wherein during the searching operation, a default printing option for the unsupported printing option can be searched for as the replacement printing option.

15. The image forming method according to claim 11, further comprising:
displaying the replacement printing option found, and receiving the user's setting of the replacement printing option to replace the unsupported printing option.

16. The image forming method according to claim 15, wherein during the operation of receiving the user's setting of the replacement printing option, a user interface window, including a first area to display the unsupported printing option from among the printing options set for the XPS file, and a second area, to display the replacement printing option searched by a control unit, can be generated.

17. The image forming method according to claim 15, wherein during the operation of receiving the user's setting of the replacement printing option, the replacement printing option to replace each unsupported printing option can be set.

18. The image forming method according to claim 15, wherein during the operation of receiving the user's setting of the replacement printing option, a single replacement printing option to replace the same unsupported printing options among the unsupported printing options can be set, and
during the printing operation, the XPS file can be printed by collectively changing the same unsupported printing options to the replacement printing option set by the user.

19. The image forming method according to claim 15, wherein during the operation of receiving the user's setting of the replacement printing option, a preview of a printing state to be set can be displayed if the user selects at least one of the replacement printing options.

20. The image forming method according to claim 11, further comprising:
storing the XPS file in which the unsupported printing option is replaced with the replacement printing option.

21. A peripheral device, comprising:
a host port to receive an Extensible Markup Language (XML) Paper Specification (XPS) file with printing options;
a printing option adjustment unit to establish whether the printing options of the XPS file are supported by the peripheral device; and
a display to indicate whether a printing option of the XPS file is supported by the peripheral device,
wherein the Extensible Markup Language (XML) Paper Specification (XPS) file is hierarchically divided into a job level, a document level, and a page level and the printing options for the job level are applied to the corresponding job, the printing options for the document level are applied to the corresponding document, and the printing options for the page level are applied to the corresponding page, with the printing option adjustment unit to search for the replacement printing option according to a replacement option setting pattern.

22. The peripheral device of claim 21, wherein the printing option adjustment unit can perform a search for a replacement printing option using a preset printing option automatic adjustment algorithm when a printing option of the XPS file is not supported by the peripheral device.

23. A method of replacing unrecognized printing options of an Extensible Markup Language (XML) Paper Specification (XPS) file with recognized printing options within a peripheral device, comprising:
receiving a XPS file with printing options;
verifying whether printing options within the XPS file are recognized by the peripheral device;
searching within a peripheral device database for recognized printing options similar to any unrecognized printing options within the XPS file;
replacing the unrecognized printing options within the XPS file with the recognized printing options; and
displaying an indication that the unrecognized printing options were replaced with the recognized printing options,
wherein the Extensible Markup Language (XML) Paper Specification (XPS) file is hierarchically divided into a job level, a document level, and a page level and the printing options for the job level are applied to the corresponding job, the printing options for the document level are applied to the corresponding document, and the printing options for the page level are applied to the corresponding page, with the replacing the unrecognized printing options including a printing option according to a replacement option setting pattern.

* * * * *